United States Patent [19]

Vacca

[11] Patent Number: 5,465,017
[45] Date of Patent: Nov. 7, 1995

[54] GEARED MOTOR FOR DRIVING A WINDSHIELD WIPER DEVICE FOR A MOTOR VEHICLE

[75] Inventor: Frédéric Vacca, Behoust, France

[73] Assignee: Valeo Systemes d'Essuyage, Montigny-le Bretonneux, France

[21] Appl. No.: 173,654

[22] Filed: Dec. 17, 1993

[30] Foreign Application Priority Data

Dec. 17, 1992 [FR] France .................. 92 15243

[51] Int. Cl.⁶ .................................... H02K 7/116
[52] U.S. Cl. ................................................ 310/83
[58] Field of Search ................ 310/80, 83; 74/42

[56] References Cited

U.S. PATENT DOCUMENTS

| | | | |
|---|---|---|---|
| 2,861,457 | 11/1958 | Harrison | 74/75 |
| 3,415,132 | 10/1968 | Druseikis | 74/42 |
| 4,701,971 | 10/1987 | Prohaska | 15/250.21 |
| 5,201,094 | 4/1993 | Yamamoto et al. | 15/250.13 |
| 5,203,219 | 4/1993 | Blanchet | 74/42 |
| 5,287,585 | 2/1994 | Yamamoto et al. | 15/250.13 |
| 5,333,351 | 8/1994 | Sato | 15/250.13 |

FOREIGN PATENT DOCUMENTS

| | | |
|---|---|---|
| 0316831 | 5/1989 | European Pat. Off. . |
| 2240623 | 3/1975 | France . |
| 2580567 | 10/1986 | France . |
| 3405299 | 8/1985 | Germany . |

OTHER PUBLICATIONS

Derwent abstract of Document No. FR A2 240 623.

*Primary Examiner*—Thomas M. Dougherty
*Assistant Examiner*—D. R. Haszko
*Attorney, Agent, or Firm*—Morgan & Finnegan

[57] ABSTRACT

A geared motor includes an electric motor which drives a wheel actuating a direction reversal mechanism, this direction reversing mechanism actuating the output shaft of the geared motor.

According to the invention, the wheel has fixed thereto a driving device connecting the direction reversal mechanism to the wheel.

6 Claims, 2 Drawing Sheets

GEARED MOTOR FOR DRIVING A WINDSHIELD WIPER DEVICE FOR A MOTOR VEHICLE

FIELD OF THE INVENTION

The present invention relates to a geared motor suitable for driving a windshield wiper device, in particular for a motor vehicle. Such a geared motor is normally used to drive a wiper adapted to wipe a glazed surface, such as a windshield in a motor vehicle.

BACKGROUND OF THE INVENTION

In the devices of the Prior Art, a geared motor is formed by an electric motor comprising a stator and a rotor, in which the rotor shaft is extended by a worm gear driving a toothed wheel actuating a direction reversal mechanism, such as a connecting rod and crank system. The connecting rod, mounted eccentrically on the toothed wheel via an axis, achieves an oscillating movement at the crank integral, during rotation, with the output shaft of the geared motor. This oscillating movement is transformed into a movement of reciprocating rotation at the output shaft which is connected, for example, to a windshield wiper arm bearing a windshield wiper blade or a mechanism for the transmission of movement to the windshield wiper arms.

Similarly, a geared motor is known in which the shaft of the rotor bears two worm gears capable of meshing with two primary pinions, these pinions driving two secondary pinions meshing with the toothed wheel which actuates the direction reversal mechanism referred to above.

As better described in FR-A-2,240,623, the toothed wheel has a variety of recesses which enable the distance between the axis of the wheel and the axis connecting the connecting rod of the direction reversal mechanism to be varied.

Such recesses are provided so that it is possible to vary the angle of deflection of the crank and consequently the output shaft driving the windshield wiper system.

It has become apparent that such an arrangement of recesses on the toothed wheel produces a weakening in the strength of the wheel, which has to be capable of withstanding the driving torque of the worm gear and the load moment of the direction reversal mechanism and of the output shaft.

Furthermore, this kind of wheel cannot be adapted to every type of angle of deflection desired for the output shaft.

If fact, it is necessary to use a variety of wheels equipped with recesses in order to be able to adapt the mechanism to the angle of deflection desired.

DISCUSSION OF THE INVENTION

In order to minimise the above-mentioned disadvantages, the object of the invention is to use a toothed wheel with a very simple device which enables any type of angle of deflection to be obtained on the output shaft.

For this purpose, according to the invention, a geared motor for driving a windshield wiper device for a motor vehicle, comprising an electric motor actuating a wheel which can move around an axis and driving a direction reversal mechanism actuating a drive shaft, is characterised in that the wheel carries, in a fixed manner, a driving device attached to said wheel and connecting the direction reversal mechanism to said wheel.

As a result of this driving device, the centre distance between the toothed wheel and the axle connecting the connecting rod of the direction reversal mechanism to this wheel can be easily regulated, by a simple part which is subsequently attached to this wheel, this part being of minimal cost and having a very simple design.

According to another characteristic of the invention, the driving device is formed by a plate. According to another characteristic, the driving device is supported by a seat provided on the wheel.

According to another characteristic, the seat is formed by two shoulders protruding in relation to one of the faces of the wheel. In another embodiment, the shoulders are disposed on both sides of the axis of the wheel.

Preferably, the driving device has a hole for connection with the direction reversal mechanism, and according to another characteristic, the driving device comprises a bore cooperating with the shaft of the wheel.

In another embodiment, the plate is fixed to the wheel by hammering the end of the shaft.

Other advantages and characteristics of the invention will become apparent from the following description with reference to the attached drawings.

DESCRIPTION OF THE PREFERRED EMBODIMENTS OF THE INVENTION

Figure 1:
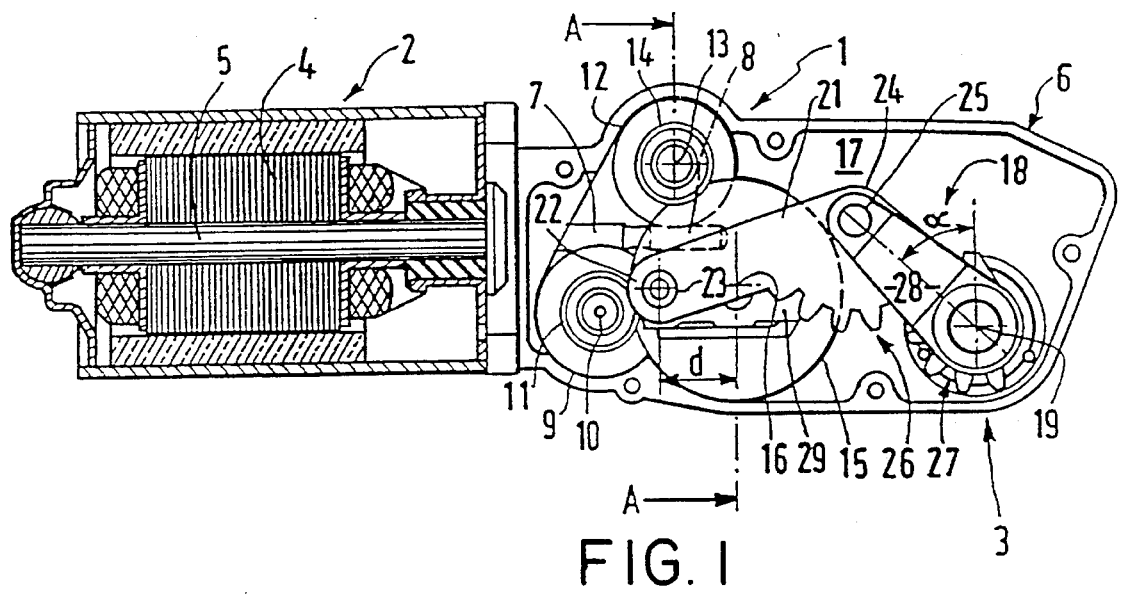
FIG. 1 shows a geared motor according to the invention.
Figure 2:
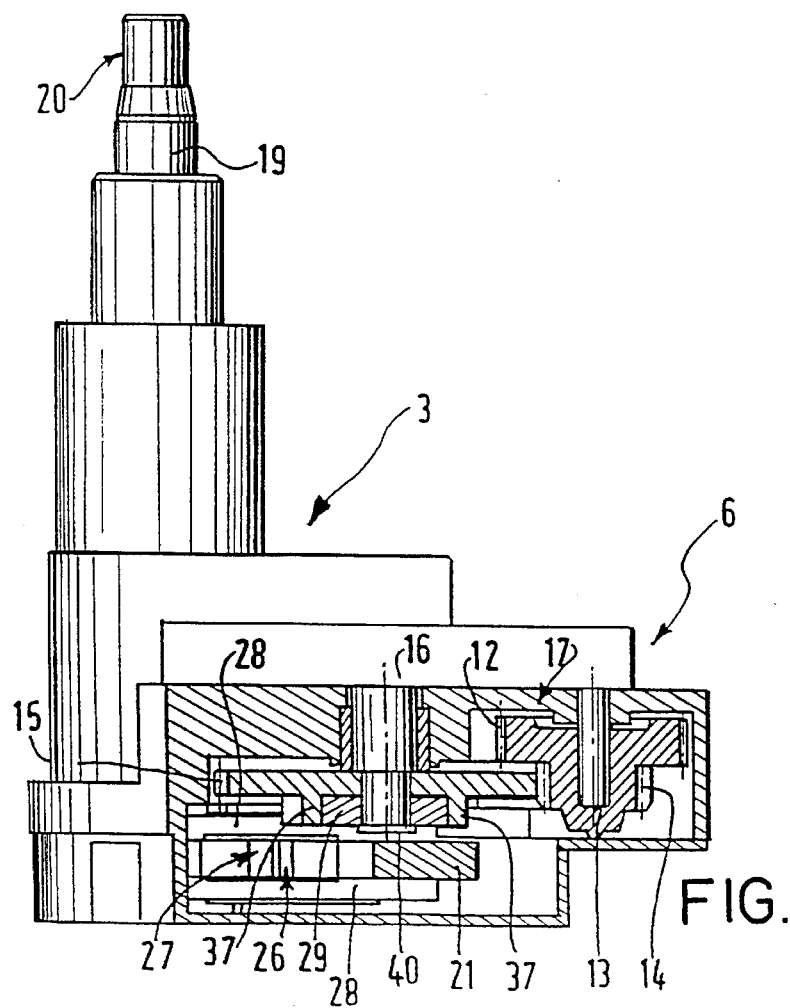
FIG. 2 is a sectional view along line AA of FIG. 1.

With reference to FIGS. 1 and 2, the geared motor 1 comprises an electric motor 2 associated with a reduction gear device 3.

In the case of the geared motor shown by way of example in the figures, the electric motor 2 comprises a rotor 4, the rotor shaft 5 of which is extended inside a housing 6 capable of accomodating the reduction gear device.

The shaft 5 bears two worm drives 7, 8 cut at the end of the shaft adjacent to one another; the pitch of the two worms runs in opposite directions and is equal.

Cooperating with the worm 7 is a primary pinion 9 having an axis 10 perpendicular to the general axis of the rotor shaft 5. This pinion bears a secondary pinion 11 having a smaller diameter in a concentric and integral manner.

Cooperating with the worm 8 is a primary pinion 12 having an axis 13 parallel to the axis 10. This pinion 12 bears a secondary pinion 14 having a smaller diameter, also in a concentric and integral manner.

As can better be seen in FIG. 1, the diameters of the primary pinions are identical, as are the diameters of the secondary pinions, and the axes 10, 13 are disposed on both sides of the axis of the shaft 5 whilst being at the same distance therefrom.

The secondary pinions 11, 14 mesh with a toothed wheel 15 having an axis of rotation 16 which is substantially parallel to the axes 10, 13.

In a practical manner the axes 10, 13, 16 are supported by the base 17 of the housing whilst enabling the rotation of these pinions and of this toothed wheel.

The toothed wheel 15 is capable of driving a direction reversal mechanism 18 which enables the inversion of the direction of rotation of an output shaft 19 which is supported by the base of the housing 17 in order to obtain a reciprocal rotational movement of this output shaft.

As can be better seen in FIG. 2, the output shaft 19 extends in a direction which is substantially parallel to the axes 10, 13 and 16 whilst passing through the base 17 of the housing and emerging on the other side so that it can be connected, by its free end 20, either to a windshield wiper arm (not shown), or to a mechanism for the transmission of movement to a windshield wiper arm (not shown).

The direction reversal mechanism 18 is formed by an arm 21 rotatingly connected by one of its ends 22 to the toothed wheel 15 by a pin 23 disposed eccentrically in relation to the axis 16 of the wheel whilst being parallel thereto.

Thus the arm is subject to a rotational movement around the axis 16 of the wheel 15 whilst being associated with a movement of translation resulting from the rotation of the pin 23 around the axis 16.

The other end 24 of the arm is provided with an axis 25 and, concentrically to said axis, a toothed sector 26 capable of moving around the axis 25.

This toothed sector 26 is capable of meshing with an input sector 27 provided concentrically and integrally by the output shaft 19.

The output shaft 19 is connected to the axis 25 and, in a manner known per se, by two end plates 28 situated on both sides of the toothed sectors 26, 27.

The end plates 28 can freely rotate around the axis of the output shaft 19 whereas the axis 25 is mounted in a rotationally fixed manner on said end plates so that it can permit an oscillation of the arm 21 around the axis 25.

Thus, when the shaft 5 of the rotor 4 rotates, the primary pinions are driven by this shaft and the secondary pinions, which are integral with the primary pinions, transmit the rotational movement to the toothed wheel 15.

During the rotational movement of the wheel 15, the pin 23 carried by this wheel is rotated around the axis 16, this rotational movement being transformed into a movement of reciprocating rotation of the output shaft 19 by the action of the arm 21 and the cooperation of the toothed sectors 26, 27.

By studying FIG. 1, it is easy to understand that the distance d corresponding to the space between the axis 16 of the toothed wheel 15 and the axis of the pin 23 gives a certain angular deflection of the output shaft 19, this deflection corresponding to an angle α marked on the figure.

Thus, by varying the distance d as previously defined, the angle α is consequently varied.

Figure 3:
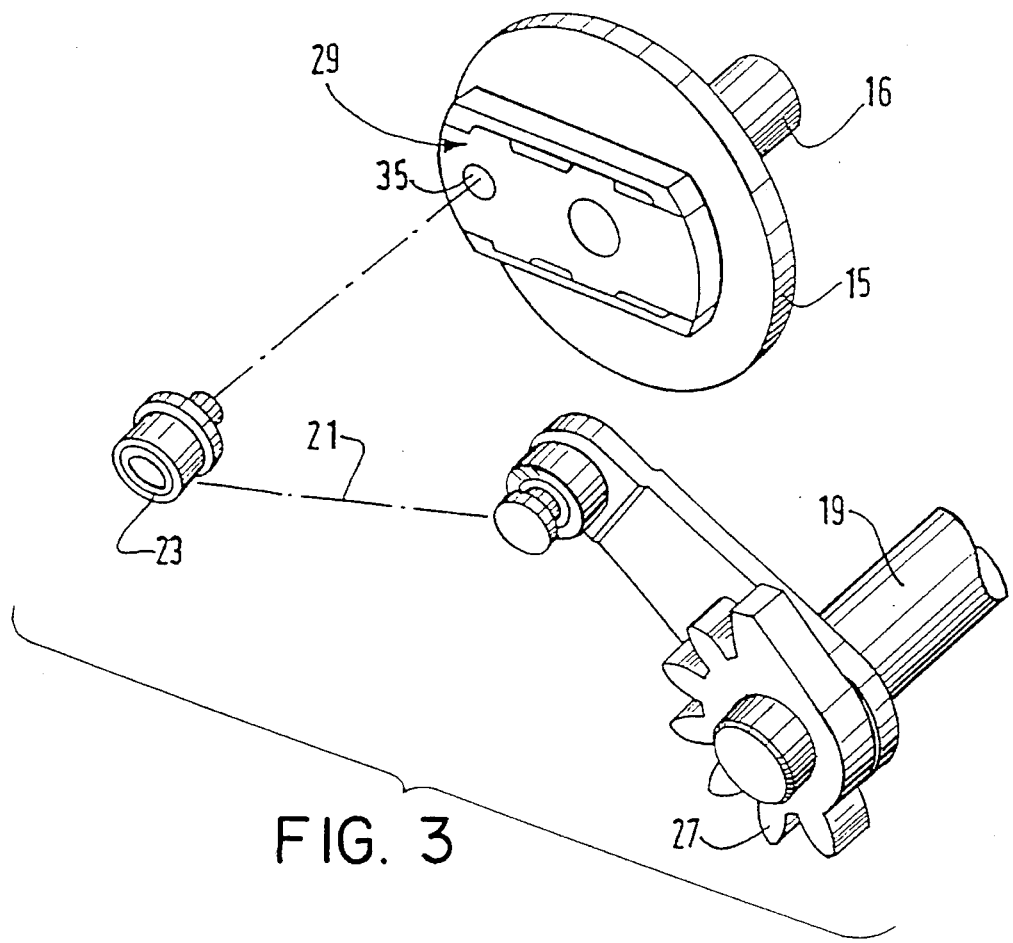
FIG. 3 is a partial perspective view showing a part of the geared motor according to the invention.
Figure 4:
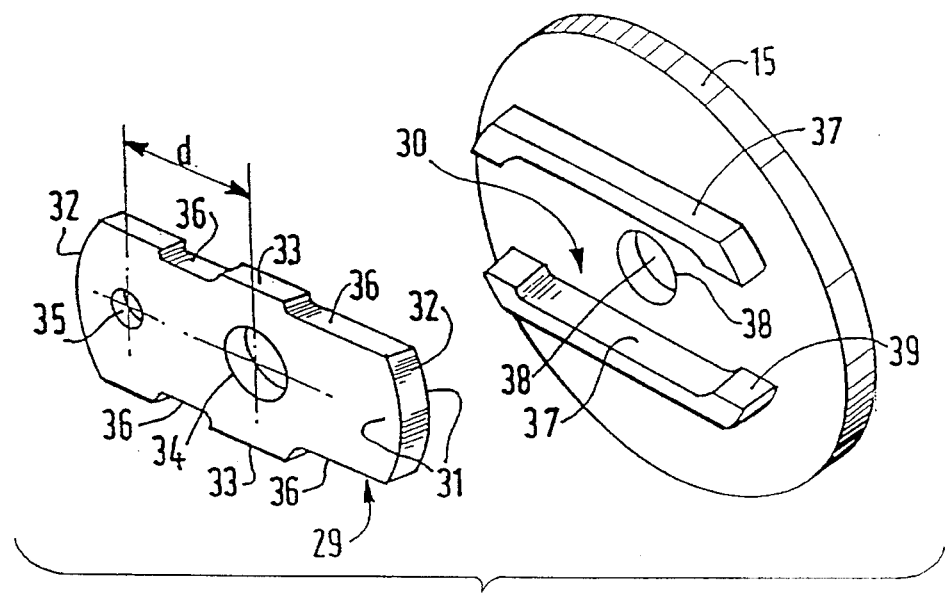
FIG. 4 is a perspective view showing a detail of the invention.

In order to accomplish this, and now referring to FIGS. 3 and 4, toothed wheel 15 bears, in a fixed manner, a driving device enabling the distance d and consequently the angle α to be varied as desired.

The driving device is in the form of a plate 29 which is housed in a seat 30 provided on the toothed wheel 15.

This plate 29 has a substantially parallelepiped shape, two large plane faces 31 which are substantially parallel to one another, two small lateral surfaces 32, here with a rounded shape, and two large sides 33 parallel to one another and orthogonal to the plane faces 31.

Through the plane faces 31 passes a bore 34 orthogonal to the plane faces and a hole 35 situated at a distance from the bore 34, whilst also being orthogonal to the faces 31 of the plate 29.

Furthermore, the edges 33 of the plate 29 have recesses 36 which allow this plate have a reduced volume.

This plate is housed in seat 30 of the wheel 15, which here is formed by two shoulders 37 substantially parallel to one another and at a distance from one another. As can be seen on the figures, the wheel 15 is borne by a shaft 16 passing through a bore 38 in the wheel 15 and the shoulders 37 are situated on both sides of this bore 38.

Now with reference to FIG. 2, these shoulders 37 protrude in relation to the outer face of the wheel 15, have a height substantially equal to the thickness of the plate 29, i.e. the distance separating the two plane faces 31 of this plate, and have a clearance substantially equal to the clearance between the two large sides 33 of the said plate.

As can be seen on FIG. 4, these shoulders 37 have a substantially constant thickness except at one of their ends which has a bulge 39 capable of cooperating with the end recesses 36 of the plate 29, i.e. those situated on the right-hand part of FIG. 4.

In a practical manner the diameter of the bore 38 of the wheel 15 and the diameter of the bore 34 are substantially identical but may be different, the diameter of the bore 34 being in this case smaller than the diameter of the bore 38.

Thus, to mount this driving device on the wheel 15, it is a simple matter to mount this plate so that the bore 34 corresponds to the bore 38 of the wheel 15, to introduce the end of the shaft 16 then, as represented in FIG. 2, to hammer the end 40 of the shaft 16 so as to obtain a fixed connection for example between the wheel 15, the plate 29 and the shaft 16.

This plate is also immobilised during rotation by the two shoulders 37.

After mounting this plate on the wheel, it is simply necessary to introduce the pin 23 into the bore 35 to obtain a geared motor as represented on FIG. 1.

In consequence of this plate 29, it is easily possible to vary the centre distance between the bore 34, 35 and for this reason the angle of deflection α of the output shaft 19 by having a variety of plates which can be easily mounted on the wheel which will undergo no modification during these changes in plate, and the seat 30 remaining identical for all the plates.

The present invention is not restricted to the embodiments described, but includes any refinement within the scope of the claims hereto.

In particular it is possible that the reduction gear system comprises only one toothed wheel driven directly by the rotor shaft 5, the said toothed wheel driving the direction reversal mechanism 18.

What is claimed is:

1. A geared motor for driving a windshield wiper device, in particular for a motor vehicle, comprising an electric motor adapted to actuate a wheel which moves around an axis and drives a direction reversal mechanism actuating an output shaft, wherein said wheel carries, in a fixed manner, a driving device formed by a plate attached to said wheel and supported entirely by a seat provided on the wheel, the driving device connecting the direction reversal mechanism to said wheel.

2. A geared motor according to claim 1, wherein the seat is formed by two shoulders protruding in relation to one of the faces of the wheel.

3. A geared motor according to claim 2, wherein the shoulders are disposed on both sides of the axis of the wheel.

4. A geared motor according to claim 1, wherein said driving device is provided with a hole for connection with the direction reversal mechanism.

5. A geared motor according to claim 1, wherein said wheel is carried by a shaft, and the driving device comprises a bore cooperating with the shaft of the wheel.

6. A geared motor according to claim 3, wherein said driving device is fixed to the wheel by caulking the end of said shaft.

* * * * *